(12) United States Patent
Rodrigues

(10) Patent No.: US 10,177,975 B2
(45) Date of Patent: *Jan. 8, 2019

(54) METHOD AND APPARATUS OF PERFORMING REMOTE MANAGEMENT OF A MANAGED MACHINE

(71) Applicant: KASEYA LIMITED, Dublin (IE)

(72) Inventor: Derek Rodrigues, Ojai, CA (US)

(73) Assignee: KASEYA LIMITED, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 15/490,652

(22) Filed: Apr. 18, 2017

(65) Prior Publication Data

US 2017/0222874 A1    Aug. 3, 2017

Related U.S. Application Data

(63) Continuation of application No. 15/257,486, filed on Sep. 6, 2016, now Pat. No. 9,628,523, which is a continuation of application No. 14/855,069, filed on Sep. 15, 2015, now Pat. No. 9,438,474, which is a continuation of application No. 13/116,259, filed on May 26, 2011, now Pat. No. 9,137,104.

(51) Int. Cl.
*H04L 12/26* (2006.01)
*H04L 12/24* (2006.01)
*H04L 12/751* (2013.01)
*H04L 29/12* (2006.01)
*H04L 29/06* (2006.01)

(52) U.S. Cl.
CPC ........ *H04L 41/0806* (2013.01); *H04L 43/106* (2013.01); *H04L 45/026* (2013.01); *H04L 61/2553* (2013.01); *H04L 65/1003* (2013.01); *H04L 65/1063* (2013.01); *H04L 65/1083* (2013.01); *H04L 65/4084* (2013.01)

(58) Field of Classification Search
CPC  H04L 41/0806; H04L 43/106; H04L 65/1063
See application file for complete search history.

(56) References Cited

U.S. PATENT DOCUMENTS

| | | | | |
|---|---|---|---|---|
| 2001/0000812 A1* | 5/2001 | Waldo | ... | G06F 9/4411 709/225 |
| 2002/0007410 A1* | 1/2002 | Seagren | ... | G06F 9/465 709/227 |
| 2002/0161860 A1* | 10/2002 | Godlin | ... | G06F 17/30212 709/219 |
| 2002/0162021 A1* | 10/2002 | Audebert | ... | G06Q 20/3672 726/4 |

(Continued)

*Primary Examiner* — Gregory B Sefcheck
*Assistant Examiner* — Jael M Ulysse

(57) ABSTRACT

Disclosed are an apparatus and method of remotely communicating with a managed machine. One example method of operation may include selecting the managed machine operating in a communication network, transmitting a connection request message to the managed machine and establishing a secure connection between the managed machine and an administrator machine. The example method may also include responsive to connecting with the managed machine, executing a host service on the managed machine, and connecting to the host service over the communication network via an application client operating on the administrator machine.

20 Claims, 8 Drawing Sheets

(56) References Cited

U.S. PATENT DOCUMENTS

| | | | | |
|---|---|---|---|---|
| 2002/0172366 A1* | 11/2002 | Peterka | H04N 7/165 | 380/277 |
| 2003/0069923 A1* | 4/2003 | Peart | G06F 9/547 | 709/203 |
| 2003/0074393 A1* | 4/2003 | Peart | G06F 9/547 | 709/203 |
| 2003/0097401 A1* | 5/2003 | Bauman | H04L 69/16 | 709/203 |
| 2004/0250130 A1* | 12/2004 | Billharz | H04L 63/0272 | 726/15 |
| 2005/0091310 A1* | 4/2005 | Salomon | G06F 9/5077 | 709/203 |
| 2005/0120214 A1* | 6/2005 | Yeates | H04L 63/08 | 713/171 |
| 2005/0272455 A1* | 12/2005 | Oommen | H04W 4/08 | 455/518 |
| 2006/0168262 A1* | 7/2006 | Frazer | H04L 29/06 | 709/230 |
| 2006/0281451 A1* | 12/2006 | Zur | H04W 4/50 | 455/422.1 |
| 2007/0050499 A1* | 3/2007 | Atherton | G06F 11/3466 | 709/224 |
| 2007/0061460 A1* | 3/2007 | Khan | H04L 41/00 | 709/225 |
| 2009/0006590 A1* | 1/2009 | Shamilian | H04L 12/24 | 709/223 |
| 2009/0036111 A1* | 2/2009 | Danford | H04L 41/0893 | 455/419 |
| 2009/0106571 A1* | 4/2009 | Low | G06F 9/4856 | 713/310 |
| 2010/0274982 A1* | 10/2010 | Mehr | G06F 11/1458 | 711/162 |
| 2012/0290642 A1* | 11/2012 | Shaughnessy | H04L 67/2823 | 709/203 |

* cited by examiner

METHOD AND APPARATUS OF PERFORMING REMOTE MANAGEMENT OF A MANAGED MACHINE

CROSS REFERENCE TO RELATED APPLICATIONS

This application is a continuation of U.S. patent application Ser. No. 15/257,486, filed on Sep. 6, 2016, entitled METHOD AND APPARATUS OF PERFORMING REMOTE MANAGEMENT OF A MANAGED MACHINE, issued as U.S. Pat. No. 9,628,523 on Apr. 18, 2017, which is a continuation of U.S. patent application Ser. No. 14/855,069, filed on Sep. 15, 2015, entitled METHOD AND APPARATUS OF PERFORMING REMOTE MANAGEMENT OF A MANAGED MACHINE, issued as U.S. Pat. No. 9,438,474 on Sep. 6, 2016, which is a continuation of U.S. patent application Ser. No. 13/116,259, filed on May 26, 2011, entitled METHOD AND APPARATUS OF PERFORMING REMOTE MANAGEMENT OF A MANAGED MACHINE, issued as U.S. Pat. No. 9,137,104 on Sep. 15, 2015, the entire contents of which are hereby incorporated by reference.

TECHNICAL FIELD OF THE INVENTION

This invention relates to a method and apparatus of accessing a remotely managed machine via an administrator machine, and more specifically, establishing a connection and performing administrative functions to the managed machine over a remote connection.

BACKGROUND OF THE INVENTION

User workstations or managed machines (computing devices) operate in a data communication network by communicating with other managed machines and/or administrator machines. Regardless of the status of the machine, the administrator machines operate to support ongoing communications and applications operating on the managed machines.

Accessing and executing commands on a managed machine through an administrative interface is a common method of updating, controlling, debugging and ensuring the continued seamless operation of the managed machine. However, certain challenges are presented with the advent of varying operating systems, control interfaces and other commonalities of the managed machines operating on a data communication network. For example, various applications used by administrators to manage network computing devices often rely on a web-based browser application to engage the administrator with certain options and simple execution of administrative actions. In addition, feedback communications between the administrator machine and the managed machine(s) may require a secure connection and other communication features prior to authorizing administrative access to managed machines.

SUMMARY OF THE INVENTION

One embodiment of the present invention may include a method of remotely communicating with a managed machine. The method may include selecting the managed machine operating in a communication network, transmitting a connection request message to the managed machine and establishing a secure connection between the managed machine and an administrator machine, and responsive to connecting with the managed machine, executing a host service on the managed machine. The method may also include connecting to the host service over the communication network via an application client operating on the administrator machine.

Another example embodiment of the present invention may include an apparatus configured to remotely communicate with a managed machine. The apparatus may include a processor configured to select the managed machine operating in a communication network. The apparatus may also include a transmitter configured to transmit a connection request message to the managed machine and establish a secure connection between the managed machine and an administrator machine. Responsive to connecting with the managed machine, the processor is further configured to execute a host service on the managed machine, and connect to the host service over the communication network via an application client operating on the administrator machine.

DETAILED DESCRIPTION OF THE INVENTION

Figure 1A:
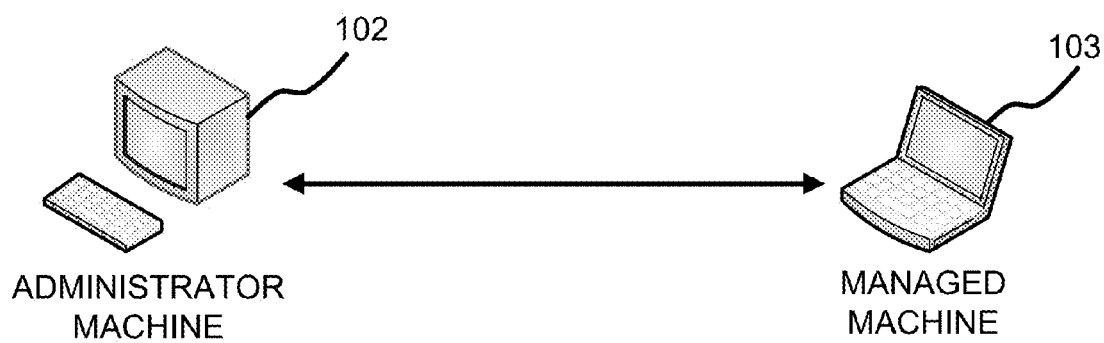
FIGS. 1A and 1B illustrate example network configurations, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, an administrator may be any information technology (IT) systems administrator, IT service provider, and/or computer owner/operator who provides administrative functions to the computer devices, communication based connections and other network resources. A managed machine may be any network-connected computer device managed by the administrator. The managed machines may be connected directly to the administrator's machine, or, over a remote network connection.

An administrator application may be a web-based application that permits the administrator to manage one or more remote managed machines. A secure network channel may be setup and established between the administrator machine and the remote managed machine via the administrator application. The secure network channel may provide connections over which data packets may be exchanged. The network channel may pass through a wide area network (WAN) (e.g. the Internet) or through a private local area network (LAN).

A server process may be an application that includes a process running on the remote managed machine. The server process accepts connections from the administrator application and assists with setting up a channel and transmitting and receiving commands and data. An administrator plug-in may be a browser plug-in operating in the context of the administrator application that connects with and interacts with the server process of the managed machine over the existing network channel.

FIG. 1A illustrates an example network communication path between a managed machine and an administrator machine, according to example embodiments of the present invention. Referring to FIG. 1A, an administrator machine 102 is in communication with a managed machine 103. The communication path between the machines may be provided over a WAN, such as the Internet, or a LAN. The administrator machine 102 may be a server, computer or other computing device capable of providing a user interface to the administrator. The managed machine 103 may be a laptop, computer, personal digital assistant, smart phone or any other computer network compatible device capable of establishing a communication path or secure channel 110 with the administrator machine 102.

Figure 1B:
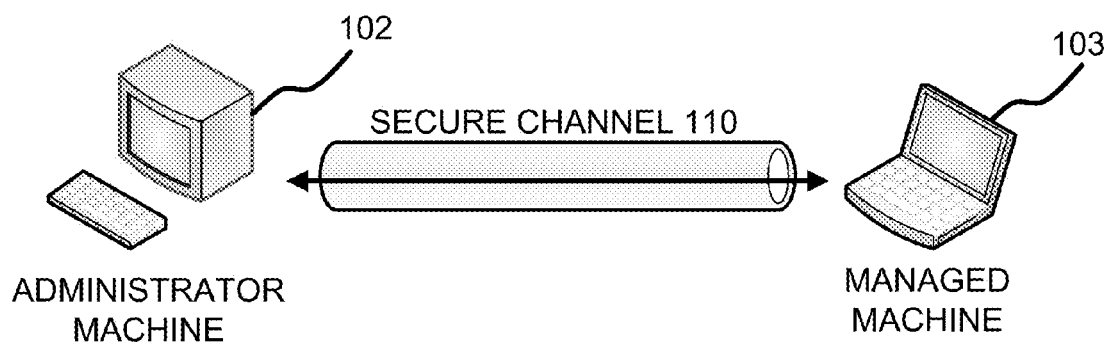

FIG. 1B illustrates an example network communication path between a managed machine 103 and administrator machine 102 that includes an established secure channel 100, according to example embodiments of the present invention. Referring to FIG. 1B, the administrator initiates a connection via a secure channel to the remote managed machine 103. The server process running on the managed machine accepts and acknowledges the connection establishment by transferring an acceptance message back to the administrator application. A secure connection may then be established between the managed machine 102 and the administrator machine 102.

Figure 2:
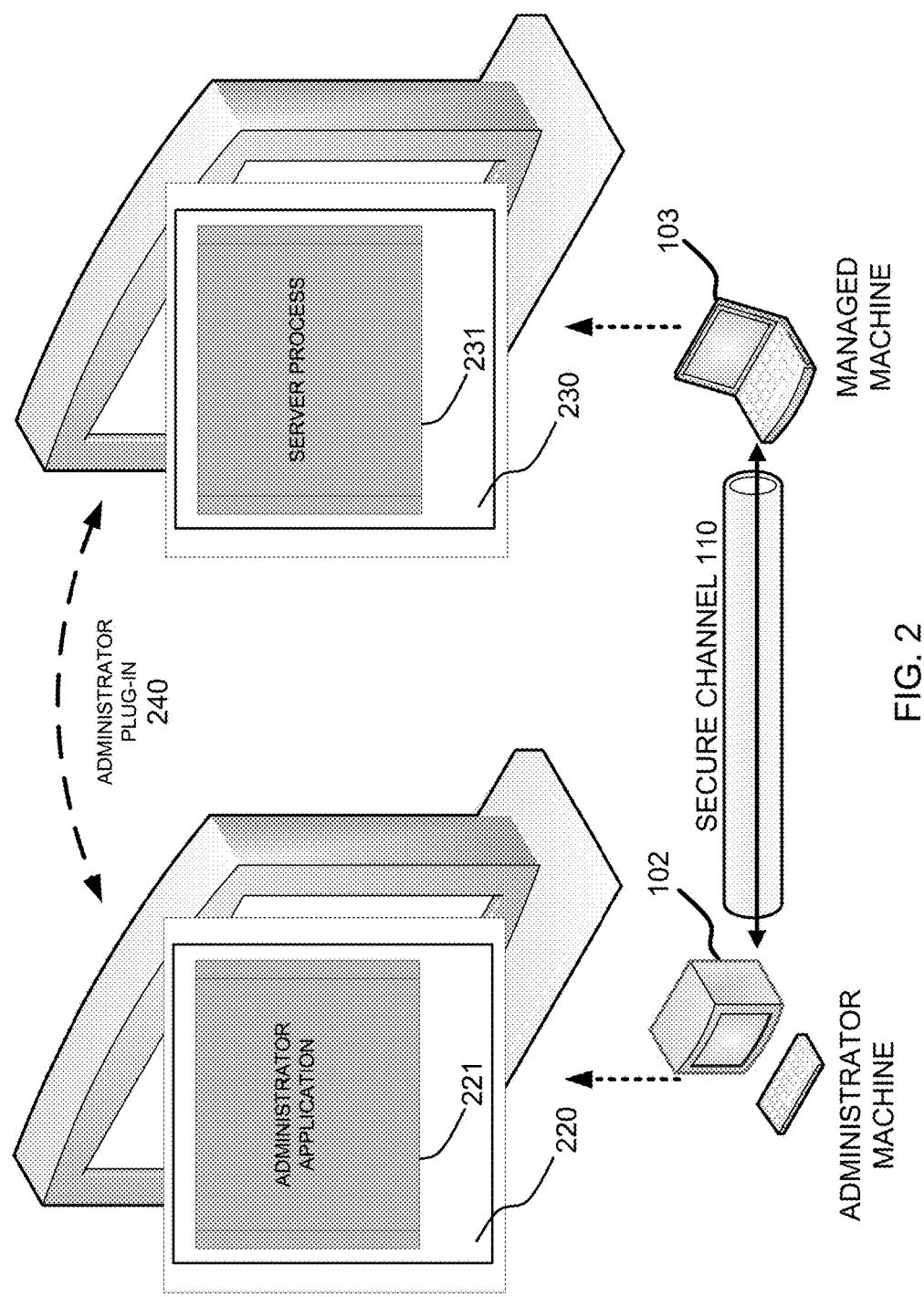
FIG. 2 illustrates an example application communication session, according to an example method of operation of the present invention.

One example method of communicating between the administrator machine 102 and the managed machine 103 is described in detail below with reference to FIG. 2. Referring to FIG. 2, the administrator application 221 of the administrator's user interface 220 may include an administrator plug-in 240, which may be executed and run in a web browser of the user interface 220 on the administrator machine 102. The web browser may establish a connection through a proprietary secure channel 110 to a server process 231 running on the application desktop 230 of the managed machine 103.

In operation, the administrator 102 browses for a particular managed machine 103 viewable from the administrator application 221. The administrator plug-in 240 initiates a connection via a secure channel to a server process 231 of the remote managed machine 103. The server process 231 running on the managed machine accepts and acknowledges the connection establishment by transferring an acceptance message back to the administrator application 221. After session establishment, the administrator may receive a notification or web browser-based indicator that certain commands may be received by the managed machine 103. The administrator may then launch a process to be executed on the managed machine 103.

Figure 3A:
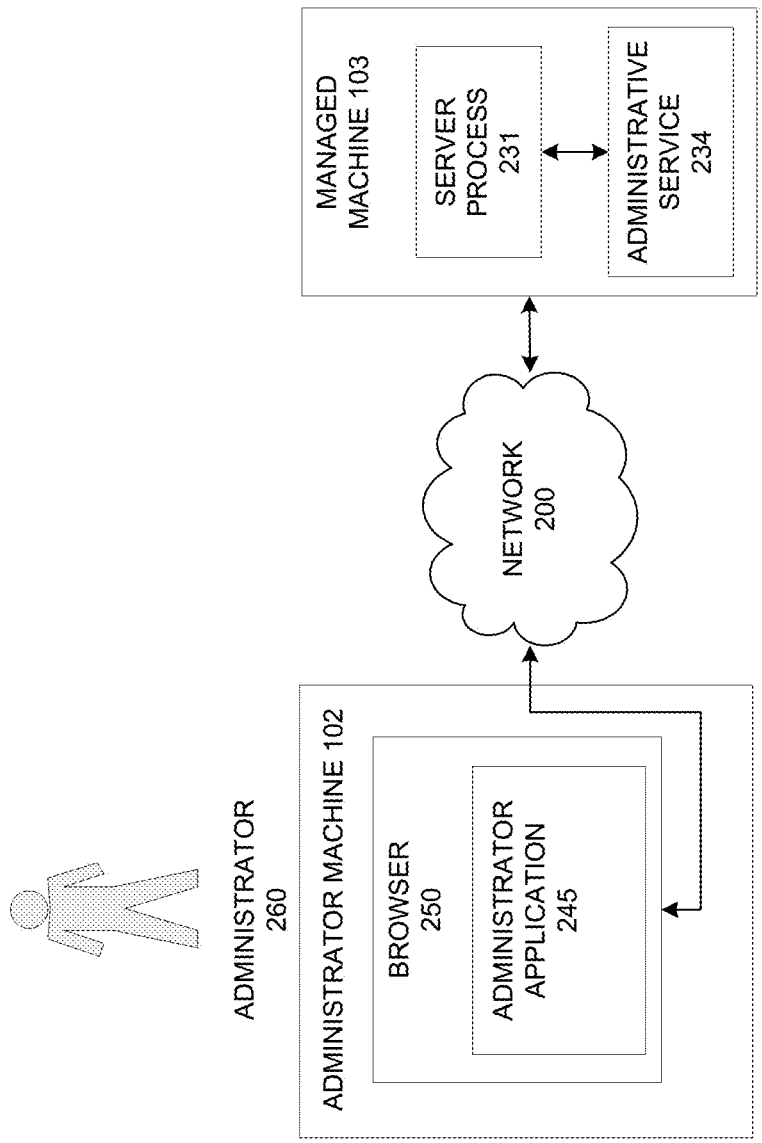
FIG. 3A illustrates an example system diagram of a communication procedure, according to an example method of operation of the present invention.

FIG. 3A illustrates an example system diagram of establishing a connection and performing a service process on the managed machine, according to an example embodiment. Referring to FIG. 3A, like reference numerals refer to like components illustrated in other drawings. The administrator 260 interfaces with the administrator machine 102 to access a web browser 250 linked to an administrator application 245. The administrator 260 may communicate across a network 200 to a remotely managed machine 103. The server process 231 may be executed on the managed machine 103 and may be linked to an administrative service 234. Generally, the managed machine 103 may be operated and controlled by a user.

In response to the administrator's communication input, the administrator application 245 running in the browser 250 of the administrator machine 102, connects over the network 200 to the remotely managed machine 103. Once a connection is established, the administrator application 245 may access administrative management functions operating on the managed machine 103. The managed machine 103 may expose administrative and management functions as types of services that may be managed by the administrator 260. The administrator application 245 running in the browser 250 may access these functions remotely via request and response messages, which are exchanged over the network 200 in a JavaScript object notation message (JSON) format.

According to example embodiments of the present invention, the service operations may be provided to the administrator remotely in the context of a live connect session that is established to perform the service operations (e.g., registry editor, task manager, file manager, etc.). The service operation messages and their corresponding responses are encoded as JavaScript object notation messages (JSON), which are used to represent simple data structures and associative arrays or objects. JSON is language-independent and uses parsing which provides interoperability of different programming languages and their corresponding operating environments. The JSON messages are created and sent over transmission control protocol (TCP) using a relayed or P2P connection. The messages are exchanged over an existing channel established by an agent, server, and/or browser application.

According to one example embodiment of the present invention, an example communication procedure between the administrator machine 102 and the managed machine 103 is discussed in detail below. The communications begin when the administrator application 245 sends a 'request for service' formulated as a JSON message to a remote managed machine 103. The JSON message is delivered over an existing (previously established) secure and reliable communication channel 110 between the browser application of the administrator machine 102 and the managed machine 103. The managed machine 103 receives the service request, identifies the appropriate service, and then acknowledges the service request by transmitting an acknowledgement message to the administrator machine 103.

Upon receipt of the acknowledgement, the administrator application 245 may then deliver administrative commands to the managed machine 103 and initiate requests for content from the service on the managed machine 103. Examples of administrative commands may include start and stop service commands, directory listing retrieval commands, etc. The request/response based interactions between the administrator 102 and the managed machine 103 may all be formatted as JSON messages and delivered over the existing secure communication channel 110.

According to one example embodiment of the present invention, the administrator application 245 transmits a request for a specific administrative service 234 (e.g., registry editing, tasks management, file browsing/transfers, etc.) on the managed machine 103. In response, a service host application on the managed machine 103 receives the application's service request and begins the requested service. The administrator application 245 then sends commands (e.g. obtain directory listing) to the administrative service 234 based on input from the administrator 260. The administrative service 234 receives and processes the commands, and performs the required function (e.g. obtaining and returning a directory listing).

Referring to FIG. 3A, a command prompt client may also be launched within the administrator application 245. Once a connection is established between the administrator machine 102 and the managed machine 103, the command prompt client may cause a command prompt to appear as part of the administrator application 245. The commands entered on the administrative application 245 may be seamlessly executed on the managed machine 103 in real-time. The command prompt client of the administrative application 245 may request a connection to the managed machine 103. As a result of the request, the server process 231 may load the command prompt client of the administrative application 245 and hand-over a command prompt communication service to the administrative service 234 of the managed machine 103. The previously established secure connection may provide a seamless transfer of command prompt commands to be entered at the administrator machine 102 and executed on the managed machine 103.

Figure 3B:
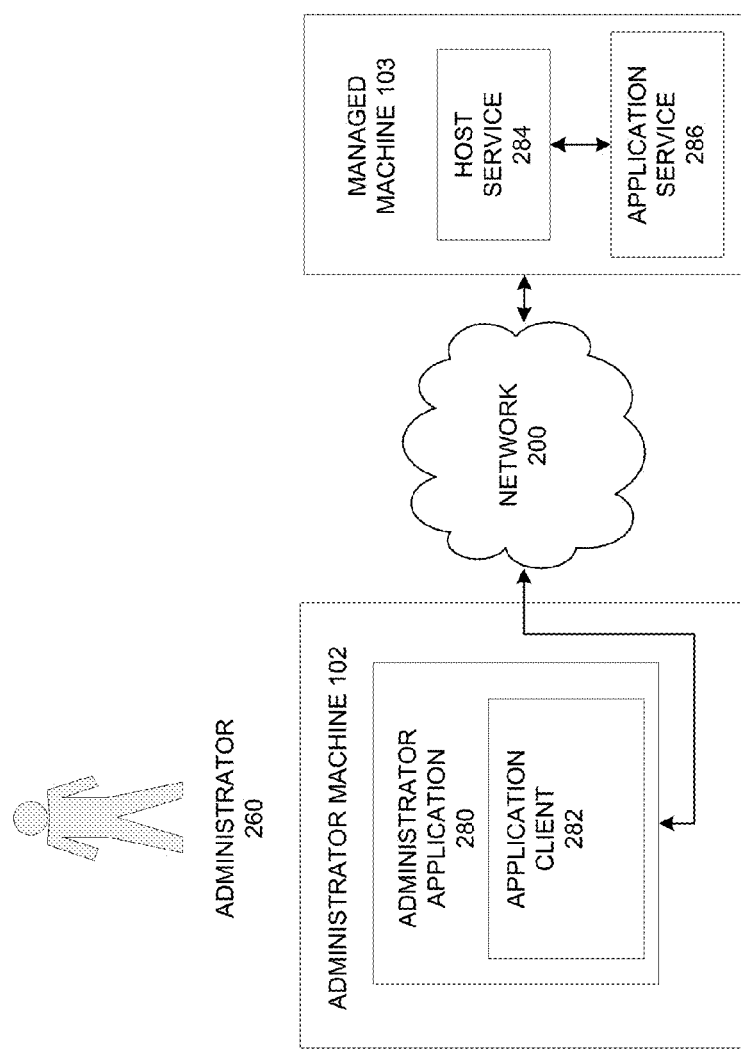
FIG. 3B illustrates another example system diagram of a communication procedure, according to another example method of operation of the present invention.

According to another example embodiment of the present invention, FIG. 3B illustrates another example of an administrative management setup configuration to manage a managed machine. Referring to FIG. 3B, an application service 286 may be a software application that is run on the managed machine 103 that exposes system/administrative functions of the managed machine 103 to remote clients, such as administrator machines 102 that are connected to the managed machine 103 over the network. Some examples of system/administrative functions may include browsing/editing of the Windows Registry, reading performance counters, stopping/starting services, reading the Windows Event Logs, etc.

The application client 282 may also be a software application that is run on the administrator machine 102 that connects and consumes the functions provided by an application service 286 running on a remote managed machine 103. The client software may be hosted in a web browser. The host service 284 may be a software application that is run on the managed machine 103. The host service 284 receives requests for one or more application services 286 from application client 282. The requests initiate the application services on behalf of the clients, and yields to the application service 286 to handle continued interactions with the application client 282.

In operation, the administrator application 280 is used by the administrator 260 to select a particular managed machine that they would like to remotely manage. As a result of this selection, the host service 284 is started on the managed machine 103. The host service 284 opens a listening socket, and the application client 282 in the administrator application 280 connects over the network 200 to the host service 284. In this example, there is already a secure network channel between the administrator machine 102 and the managed machine 103. The application client 282 sends an application information message to the host service 284 identifying a particular application service and specifying a session identifier.

The host service 284 receives the application information message request and identifies the requested application service 286. The host service 284 locates and executes a corresponding application service binary that is capable of processing the request. The host service 284 passes the connected socket to the application service and continues to wait for requests from other application clients. The application service 286 now responds to the application client 282 with an application "acceptance" message to complete initialization of the conversation.

The application client 282 and the application service 286 may then exchange any messages according to the functions of the application service and additional requests of the application client 282. The application service 286 will continue to run until the application client 282 closes the network connection. The host service 284 may have brokered additional conversations between other application clients and services from other administrators not shown.

The messages that are exchanged between application clients and the managed machine's application service may be implemented using the JSON messaging protocol. The wire-format includes a 12-byte header that further includes a message identifier and the message length indicator. The header is followed by the JSON message. All network interaction may be performed over an already established and secure network channel, such as a relayed or peer-to-peer connection between the administrator machine 102 and the managed machine 103.

In addition to boot-strapping the conversation between the application client 282 and the application service 286 (as described above), the communications further implement a 'keep alive' mechanism that allows the application service 286 to shut itself down when it is no longer needed. This prevents system resources on the managed machine 103 from being unnecessarily committed and wasted.

The 'keep alive' timing mechanism may operated by the application client 282 periodically (e.g., every 2 minutes, 1 minute, etc.) sends a 'keep alive' message to the application service 286. The application service 286 consumes the 'keep alive' message by updating a time-stamp that is measured from the time a last 'keep alive' message was received. The application service expects that a 'keep alive' message will be sent at regular intervals. If it does not receive one at an expected point in time, it may be assumed that there is a problem with the application client 282, which, in turn causes a preemptive connection termination. If there are no more application client connections/sessions present, the application service will automatically shut down.

One example using the command prompt may include the IT administrator 260 selecting a given managed machine 103 to start a remote session, which results in starting the host service 284 on the managed machine 103 (as described above). The IT administrator 260 opens the command prompt function of the administrator application 280. The command prompt application client 282 connects to the host service 284. The command prompt application client 282 sends an application "request" message to the host service identifying the command prompt service as the desired application service. The host service finds the binary data corresponding to the command prompt application service binary and loads the binary data.

The command prompt application service responds to the command prompt client with an application "acceptance" message to acknowledge that the application information message was received and processed. The command prompt client may now send messages to the command prompt application service which will process the commands accordingly.

The application service 286 may include a software application that is run on the managed machine 103 that exposes the system/administrative functions of the managed machine 103 to remote clients that are connected to the managed machine 103 over the network 200. Some examples of system/administrative functions are browsing/editing of the Windows Registry, reading performance counters, stopping/starting services, reading the Windows Event Logs, etc.

Figure 4:
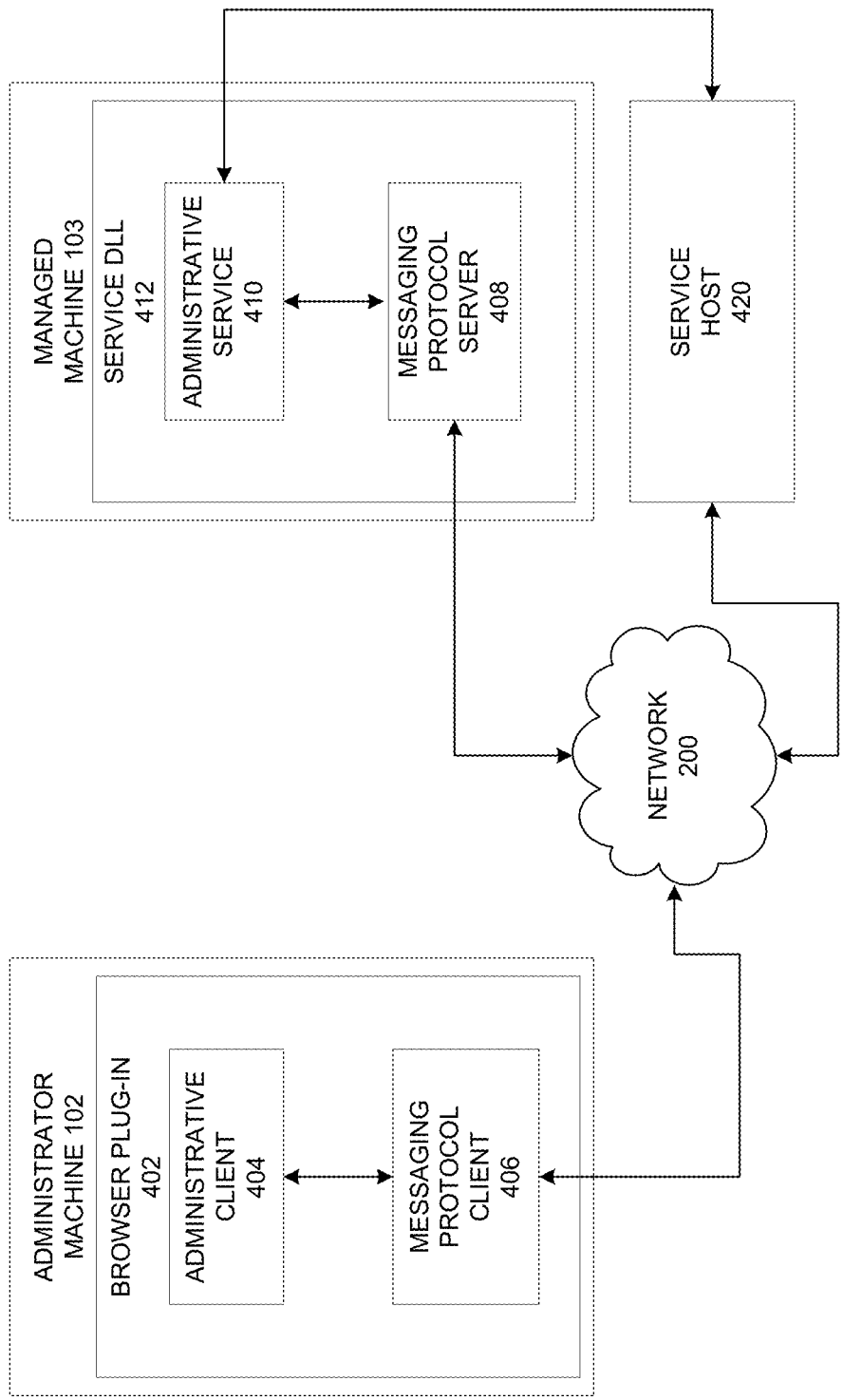
FIG. 4 illustrates an example system diagram of a messaging protocol stack, according to an example embodiment of the present invention.

The above-described example service command operations may be performed based on the messaging protocol stack of FIG. 4. Referring to FIG. 4, the administrator machine 102 may include a browser plug-in application 402, an administrative client 404 and a messaging protocol client 406. The managed machine 103 may include a service dynamic linked library (DLL) an administrative service 410 and a messaging protocol server 408. A service host 420 may be used to load and begin the requested service with the administrative service 410.

A messaging protocol may be used to support the interaction between a browser-based application of the administrator machine 102 and a requested service. The messaging protocol is used to establish the connection between the administrative client application 404 and the service, initiate the conversation between the administrator and managed machine, and deliver the application's messages and commands. The application's messages may be serialized in a JSON format for delivery over the underlying network 200. Pre-pended to each message may be a 12-byte header which includes the size of the message (in bytes) and the type of the message, which may be an integer identifier useful for the application.

The messaging protocol may implement the JSON data format as the 'wire-format' for messaging. JSON is a "light-weight data-interchange format", which is used to facilitate an extensible and adaptable object-oriented messaging protocol that has JavaScript support. The messaging protocol also implements a "keep-alive" and "time-out" mechanism employed by the messaging protocol server 408. Keep-alive messages are sent at a regular interval by the messaging protocol and consumed by the server. If the server, administrator machine 102 and/or managed machine 103 does not receive either a keep-alive or application message within a specific time, then it will drop the connection and end the conversation.

A service framework may be built on top of the messaging protocol and used to perform data communications. The service framework is the implementation by which an administrative service operating on the managed machine 103 may expose its services to a browser-based application in the administrative client application 404. Examples of administrative services may include the file manager service, registry editor service, and the task manager service.

An administrative service 410 may include both an application component and service component. The application component is exposed as a browser plug-in 402 in the administrator client application 404. The application component uses the messaging protocol layer (messaging protocol client 406 and messaging protocol server 408) to request and receive messages from the service component over the network 200. The service component is included in a service DLL 412, which implements the server-side of the messaging protocol 408 to receive and process requests from the administrative application client 404. The service DLL is loaded on demand by a service host 420.

The service host 420 is a server running on the managed machine 103. Upon accepting a connection request, the service host 420 reads an application "request message", which is a JSON formatted message that includes a service descriptor, which may be an identification of the service being requested. The service host finds the service DLL 412 corresponding to the service descriptor and then begins the service if it has not already been initiated. Beginning the service includes loading the dynamic library containing the service and creating the service instance via a user interface. The service host 420 then delegates the handling of the application connection to the service instance.

According to example embodiments of the present invention, a browser plug-in 402 (or application-side JavaScript) may dynamically load a service on a remote machine 103 and issue commands to the service via an object message protocol formatted using JSON messaging format. The messages are exchanged over the existing channel 110 established by the agent, browser, relay, or via P2P. Machine management and administrative services may be exposed via a remotely managed machine. These services may be consumed from a web browser via a JSON (JavaScript Object Notation) based object-oriented message protocol.

Figure 5A:
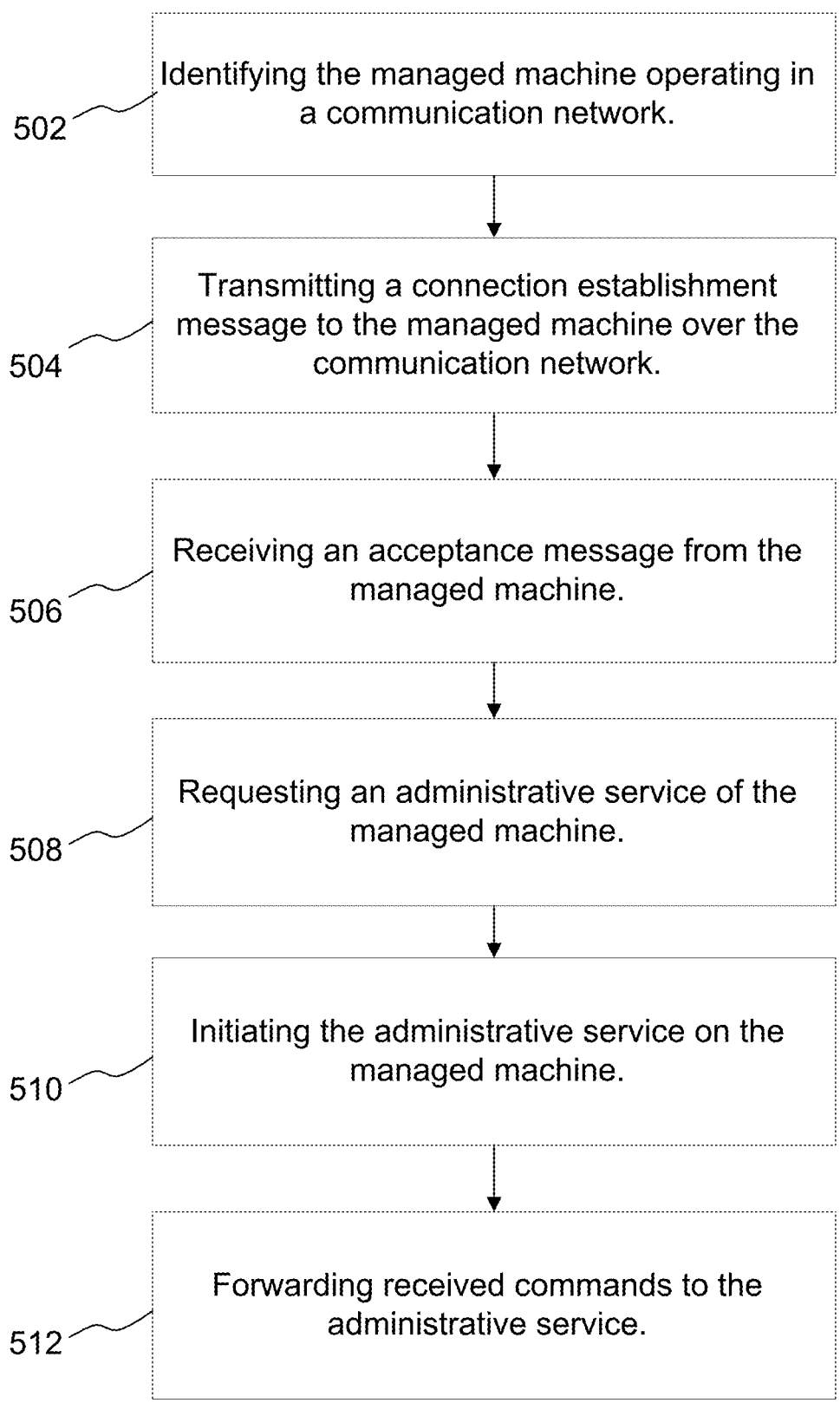
FIG. 5A illustrates a flow diagram of an example method according to an example embodiment of the present invention.

One example method of remotely managing a managed machine operation is illustrated in the flow diagram of FIG. 5A. Referring to FIG. 5A, the method may include identifying the managed machine operating in a communication network, at operation 502. The method may also include transmitting a connection establishment message to the managed machine over the communication network, at operation 504. The method may also include receiving an acceptance message from the managed machine, at operation 506, and requesting an administrative service of the managed machine, at operation 508. The method may further include initiating the administrative service on the managed machine, at operation 510 and forwarding received commands to the administrative service at operation 512.

Figure 5B:
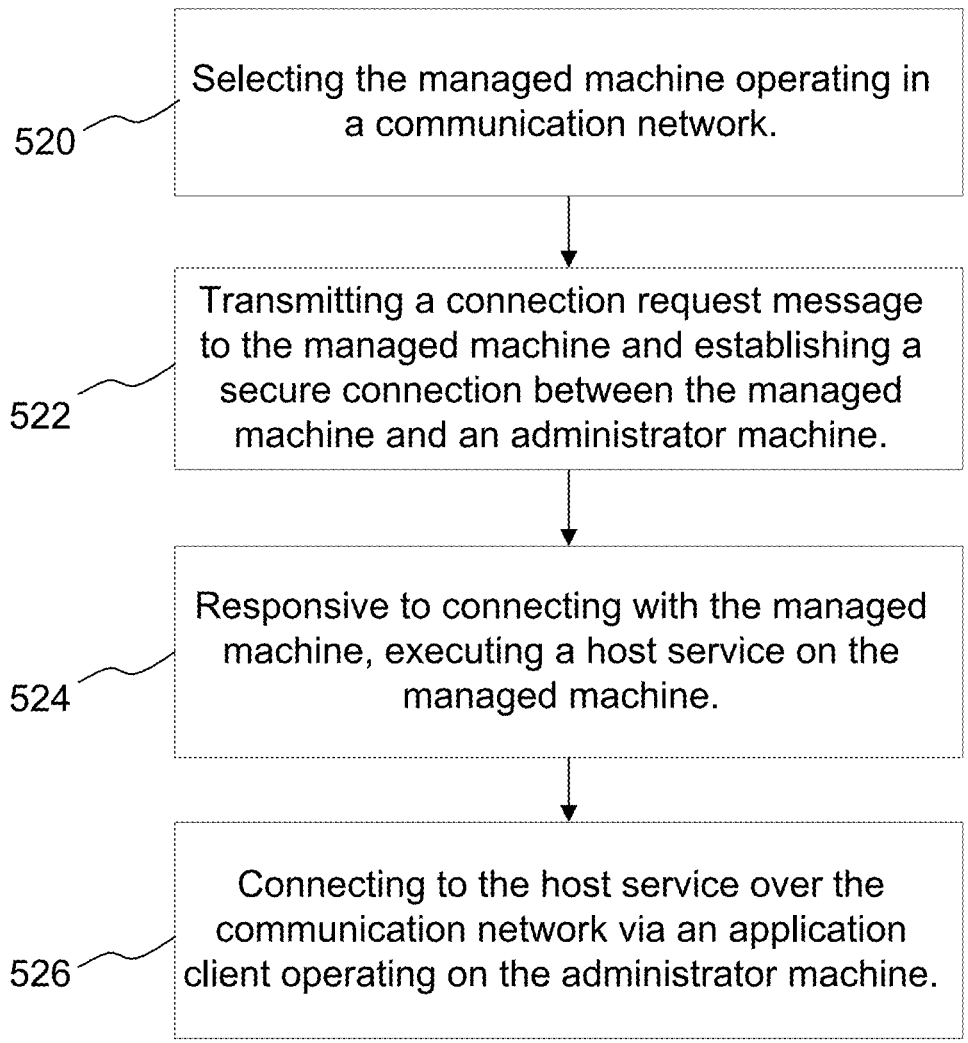
FIG. 5B illustrates a flow diagram of an example method according to an example embodiment of the present invention.

One example method of remotely managing a managed machine operation is illustrated in the flow diagram of FIG. 5B. Referring to FIG. 5B, the method may include selecting the managed machine operating in a communication network, at operation 520, transmitting a connection request message to the managed machine and establishing a secure connection between the managed machine and an administrator machine, at operation 522, and responsive to connecting with the managed machine, executing a host service on the managed machine, at operation 524. The method may also provide connecting to the host service over the communication network via an application client operating on the administrator machine, at operation 526.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components 102 and 103, etc.

Figure 6:
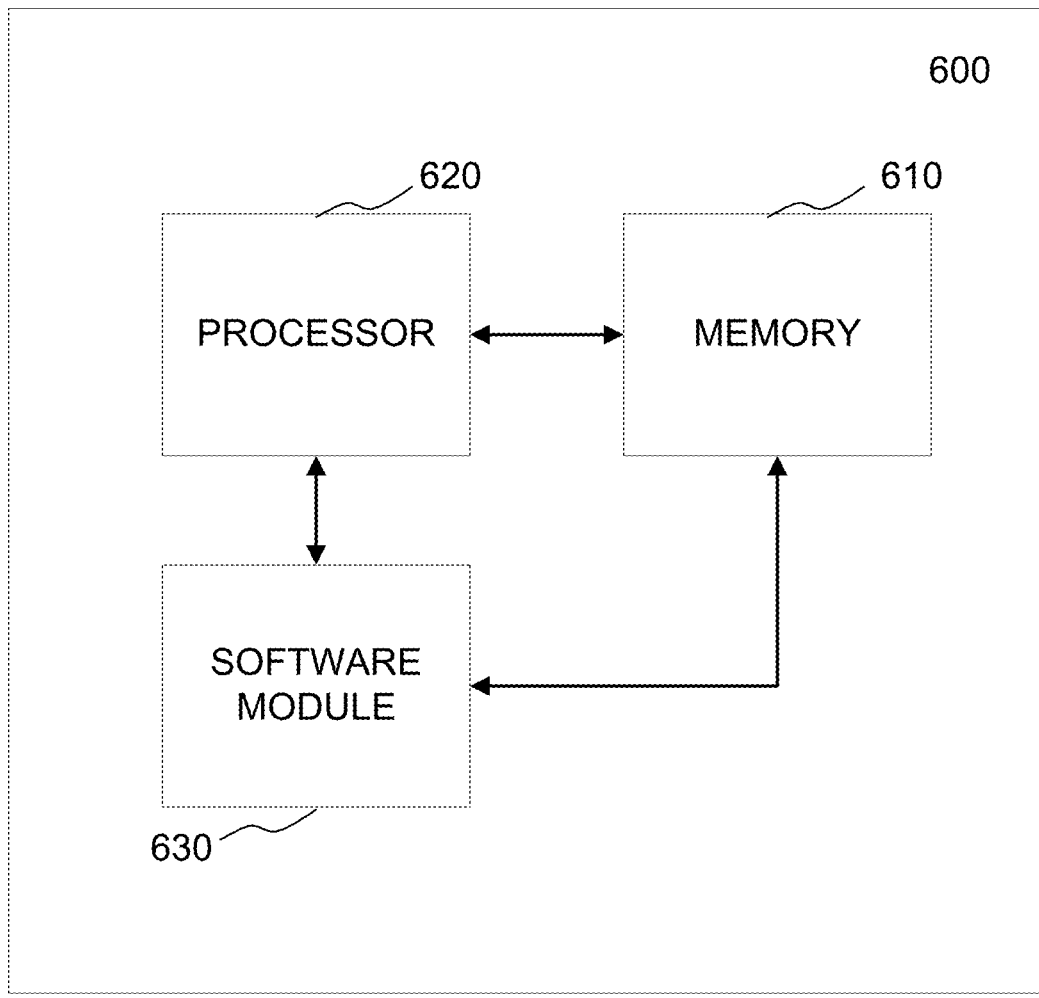
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   connecting to a host service via an application client operating on an administrator machine, wherein the host service is aware of an application service operating on a managed machine;
   establishing a command prompt on the administrator machine via an administrative service and receiving a command via the command prompt;
   transmitting the command to the managed machine and executing the command on the managed machine via the host service responsive to the command being received in the command prompt on the administrator machine, wherein the command invokes the application service to share one or more administrative functions of the managed machine with remote clients connected to the managed machine over a network connection;
   forwarding a connected socket to the application service, and waiting for a request from other application clients;
   transmitting to the application client an application information acknowledgment message to complete an initialization procedure;
   creating messages based on the shared one or more administrative functions; and
   transmitting the messages to the administrator machine.

2. The method of claim 1, comprising establishing a connection between a managed machine and an administrator machine, responsive to connecting with the managed machine, executing a host service on the managed machine, wherein executing a host service on the managed machine comprises opening a listening socket.

3. The method of claim 1, comprising selecting the managed machine.

4. The method of claim 1, comprising transmitting a connection request message to the managed machine.

5. The method of claim 1, comprising specifying a session identifier.

6. The method of claim 1, comprising exchanging the messages between the application client and the application service based on functions of the application service and corresponding to application client requests.

7. The method of claim 1, comprising transmitting a keep alive message
   periodically to the application service, the keep alive message being transmitted from the application client; and
   updating a time-stamp associated with the keep alive message via the application service.

8. An apparatus, comprising:
   a processor; and
   a transmitter;
   wherein the processor is configured to:
      connect to a host service via an application client operating on an administrator machine, wherein the host service is aware of an application service operating on a managed machine;
      execute the host service on the managed machine;
      establish a command prompt on the administrator machine via an administrative service and receive a command via the command prompt;
      transmit the command to the managed machine and execute the command on the managed machine via the host service responsive to the command being received in the command prompt on the administrator machine, wherein the command invokes the application service to share one or more administrative functions of the managed machine with remote clients connected to the managed machine over a network connection;
   wherein the processor is further configured to create messages based on the shared one or more administrative functions; and wherein the transmitter is further configured to forward a connected socket to the application service, and wait for a request from other application clients, and transmit the messages to the administrator machine; and a receiver configured to receive at the application client, an application information acknowledgment message to complete an initialization procedure.

9. The apparatus of claim 8, wherein the host service executed on the managed machine comprises opening a listening socket.

10. The apparatus of claim 8, wherein the processor is configured to select the managed machine.

11. The apparatus of claim 8, wherein the transmitter is configured to transmit a connection request message to a managed machine.

12. The apparatus of claim 8, wherein the transmitter is configured to specify a session identifier.

13. The apparatus of claim 8, wherein the processor is further configured to exchange the messages between the application client and the application service based on functions of the application service and corresponding to application client requests.

14. The apparatus of claim 8, wherein the transmitter is further configured to transmit a keep alive message periodically to the application service, the keep alive message being transmitted from the application client, and a time-stamp associated with the keep alive message is updated via the application service.

15. A non-transitory computer readable storage medium configured to store instructions that when executed cause a processor to perform:

connecting to a host service via an application client operating on an administrator machine, wherein the host service is aware of an application service operating on a managed machine;

establishing a command prompt on the administrator machine via an administrative service and receiving a command via the command prompt;

transmitting the command to the managed machine and executing the command on the managed machine via the host service responsive to the command being received in the command prompt on the administrator machine, wherein the command invokes the application service to share one or more administrative functions of the managed machine with remote clients connected to the managed machine over a network connection;

forwarding a connected socket to the application service, and waiting for a request from other application clients;

receiving at the application client, an application information acknowledgment message to complete an initialization procedure;

creating messages based on the shared one or more administrative functions; and transmitting the messages to the administrator machine.

16. The non-transitory computer readable storage medium of claim 15, comprising establishing a connection between a managed machine and an administrator machine, responsive to connecting with the managed machine, executing a host service on the managed machine, wherein executing a host service on the managed machine comprises opening a listening socket.

17. The non-transitory computer readable storage medium of claim 15, configured to store instructions that when executed cause the processor to perform selecting the managed machine.

18. The non-transitory computer readable storage medium of claim 15, configured to store instructions that when executed cause the processor to perform transmitting a connection request message to the managed machine.

19. The non-transitory computer readable storage medium of claim 15, configured to store instructions that when executed cause the processor to perform specifying a session identifier.

20. The non-transitory computer readable storage medium of claim 15, configured to store instructions that when executed cause the processor to perform exchanging the messages between the application client and the application service based on functions of the application service and corresponding to application client requests.

* * * * *